(12) United States Patent
Larsen

(10) Patent No.: US 6,179,969 B1
(45) Date of Patent: Jan. 30, 2001

(54) PROCEDURE AND FILTER DEVICE FOR REMOVAL AND/OR DESTRUCTION OF ORGANIC SUBSTANCES IN CONTAMINATED AIR

(75) Inventor: Jimmy Kjoelby Larsen, Rudkoebing (DK)

(73) Assignee: Jimco A/S, Rudkobing (DK)

( * ) Notice: Under 35 U.S.C. 154(b), the term of this patent shall be extended for 0 days.

(21) Appl. No.: 09/171,622

(22) PCT Filed: Apr. 23, 1997

(86) PCT No.: PCT/DK97/00182

§ 371 Date: Oct. 20, 1998

§ 102(e) Date: Oct. 20, 1998

(87) PCT Pub. No.: WO97/39823

PCT Pub. Date: Oct. 30, 1997

(30) Foreign Application Priority Data

Apr. 23, 1996 (DK) .................................................. 0482/96

(51) Int. Cl.[7] .......................... B01D 53/00; B01D 46/00; A62D 3/00; B03C 3/38; A61L 2/00
(52) U.S. Cl. .................................... 204/157.3; 204/158.2; 588/227; 95/273; 96/16; 422/24; 422/121; 422/124; 422/186.3; 250/437; 250/438; 55/307
(58) Field of Search .............................. 204/157.3, 158.2; 422/24, 121, 124, 186.3; 250/437, 438; 55/307; 95/273; 96/16; 588/227

(56) References Cited

U.S. PATENT DOCUMENTS 4,952,376 * 8/1990 Peterson ............................. 422/186.3

5,063,030 * 11/1991 Sweetman ............................. 422/189

FOREIGN PATENT DOCUMENTS

| 569 526 | 11/1975 | (CH) . |
| 2720201C2 | 11/1982 | (DE) . |
| 3808182 C2 | 4/1990 | (DE) . |
| 90818 | 11/1986 | (RO) . |

OTHER PUBLICATIONS

Webster's New Riverside University Dictionary, p. 1228, c.1988, no month available.*

* cited by examiner

Primary Examiner—Edna Wong
(74) Attorney, Agent, or Firm—Pennie & Edmonds LLP

(57) ABSTRACT

A procedure and a filter device (1) serving the purpose of removing and/or destruction organic substances in contaminated air. The filter device comprises at least one ventilator (12) for sending an air stream through a first chamber (14) with an opening, which is connected with a source for contaminated air; a second chamber (15) with a number of sheets (20) placed abeam the main direction of the air stream in order to make the air stream change direction at least one time; a third chamber (16) with a number of perforated tubes (22) which at least at one end are in open connection to a secondary air source; a fourth chamber with a number of lamps for radiating the air stream with a short-waved ultra-violet light and; a fifth chamber (17) with a volume, which gives the air stream a predetermined duration time in the chamber, and which has an opening, through which the purified air passes in order to be released to the surroundings. The filter device (1) is extremely efficient for purifying contaminated air from organic substances without using chemicals and physical filters, such as fat- and carbon filters, and it is hygienic and fireproof, since its interior sheets are not covered with organic materials. The releasing tubes and the ventilator are furthermore easy to clean.

12 Claims, 4 Drawing Sheets

PROCEDURE AND FILTER DEVICE FOR REMOVAL AND/OR DESTRUCTION OF ORGANIC SUBSTANCES IN CONTAMINATED AIR

This is a natural stage application of PCT/DK97100182 filed Apr. 23, 1997.

TECHNICAL FIELD

The invention concerns a procedure for removal and/or destructions of organic substances in contaminated air.

BACKGROUND ART

Organic substances in the form of vapours or particles are to a large extend created as undesired secondary products in connection with many production processes within the industry. As examples can be mentioned preparation and use of lacquer and paint, cereal and feedstuff, metal and plastic, tar and asphalt, tanneries, incinerating plants, bio-gas plants, market gardens, agriculture and also large parts of the food industry.

Today severe demands are made to the hygienic and health conditions regarding the work spots/sites as well as to the surrounding milieu. The organic substances mentioned are, however, more or less injurious to health, and furthermore many of them have a foul smell. It will therefore normally not be allowed to leak air contaminated with such organic substances to the surroundings. Purification of the air must take place before that.

This purification normally takes place by filtering he contaminated air in, for example, grease filters and carbon filters. Mechanical filters of this type are, however, rather expensive in use, since they need to be cleaned at short intervals and frequently have to be replaced. Furthermore, the filters cannot fulfill the high hygienic standard, which, for example, is required within the food industry, and to this can be added that filters, which, as an example, are filled with grease, must be considered as extremely flammable.

Furthermore, it is known technology to use ozone for removing especially foul smell from air contaminated with organic substances. The ozone is normally created in an electric arc in the form of the so-called corona-ozone, whereby there as a unfortunate side effect is created NOX, which is damaging the environment and health injuring to human beings.

In other cases different chemicals for decomposing and destroying the organic substances are added to the contaminated air. The chemicals can, however, themselves contribute to contamination of the air, and the same applies to those products which are created by the chemical reactions purifying the air.

SUMMARY OF THE INVENTION

The object of the invention is to provide a procedure of the type mentioned in the opening paragraph, which is capable of eliminating the problems connected to the currently available methods for removal of the organic substances and/or foul smell in the contaminated air.

The novelty and uniqueness of the invention, that the contaminated air is set into a streaming condition; that the created air stream is brought to change direction at least once; that the air stream is cooled off; that secondary air and/or oxygen is added to the air stream; that the air stream is radiated with ultra-violet light; that the air continues to stream for a predetermined interval of time; and that the air stream is let out into the surroundings.

Organic substances in the form of larger particles are initially separated by this method at that stage where the air stream changes direction. Then the air is relieved of particles, which otherwise could restrain the processes in the succeeding process steps.

By cooling off contaminated air, which derives from a hot continuous process, it is attained that water in the form of saturated vapour and organic substance condensate and thereby separate the air released from these vapours more easily can be processed in the succeeding steps of the process.

The oxygen supplied in the form of the oxygen content in a secondary air stream or as pure oxygen serves the sole purpose of securing, that the contaminated air sufficiently is provided with oxygen to create ozone to the necessary extent, when the air is radiated with the ultra-violet light. Since the ozone is created at a low temperature and by means of ultra-violet light, no secondary product, as previously mentioned, in the form of dangerous NOX created by corona effect, will emerge.

Certain organic substances are oxidized by the ozone in a so-called cold combustion and are thereby transformed into carbon dioxide, but many organic molecules can not be oxidized in this way. The ultra-violet light, which radiates the oxygen molecules and thereby creates ozone, will, however, at the same time influence the organic substances with a photo light effect, which splits the organic molecules, which normally would be difficult for the ozone to oxidize into molecules more easy to oxidize by ozone. Thereby is obtained that it is possible to oxidize a larger amount of the content of organic substances in the contaminated air than by means of ozone alone.

The oxidation process does not occur instantaneously, and therefore the air stream is brought to continue as long as the oxidation process of the organic substances takes, before the purified air is being released into e.g. the open air.

When the contaminated air is warmer than the supplied secondary air and/or oxygen, this secondary air advantageously can be used for cooling off the air, before it is radiated by the ultra-violet light.

Furthermore the best effect is obtained by using short wavelength ultra-violet light for the radiation.

The invention also concerns a filter device for removing and/or destroying organic substances in contaminated air, which comprises a house and a least one ventilator for sending the air stream through the house, in which there, in open connection with each other are; a first chamber with an opening, which is connected to a source of contaminated air; a second chamber with a number of metal sheets placed across the main direction of the air current which sheets are to bring the air current to change direction at least one time; a third chamber with a number of perforated tubes, as in secondary air source; a fourth chamber with a number of lamps for radiating the air current with ultra-violet light and; a fifth chamber with a volume allowing the air current, at predetermined interval of time, to stay in the chamber, and which has an opening through which the purified air is released to the surroundings.

By means of this construction the procedure according to the invention can be carried through efficiently and economically. The chambers can, for example, be built vertically on top of each other with the fifth chamber at the top. The air current, which is generated by the ventilator, is then successively passing the various chambers and thereby run through the processes which finally result in purified air being released into open air.

The ventilator can in principle be inserted any place at all in the air current, but it is most expedient to place the ventilator after the fifth chamber and connect its opening with the suction side of the ventilator.

The air passing through the ventilator is thereby purified air only, which prevents the build-up of a coating of organic substances from contaminated air in the ventilator, which would reduce the efficiency of the ventilator.

From the source of contamination the contaminated air streams into the first chamber via its inlet. It is important that the air is distributed equally in the succeeding chambers for the processes to run at their optimum. For this purpose, according to the invention, there can advantageously be placed one or more distribution sheets in the first chamber, preferably somewhere behind the inlet opening of the air.

In the second chamber the air is met by a number of de-cindering sheets forcing the air to sudden change of direction at least one time. Thereby organic particles and water drops are removed from the air.

The sheets are by an expedient embodiment placed in at least two rows across the main direction of the air current in such a way, that the sheets in each row are placed at a mutual interval, and each interval is placed opposite a sheet in the adjoining row.

The lamps for radiating the air, which streams through the fourth chamber, with short wavelength ultra-violet light, can according to the invention be high pressure U.V. lamps and/or low pressure U.V. lamps. Such lamps work best at a temperature of approximately 38° C., and it is therefore necessary to cool the air before radiation, if the supplied air has a temperature, which is higher than 38° C., such as it often is the case within, for example, the food industry.

With one embodiment an electric evaporator can be inserted in access to the fourth chamber, for example, to cool the air.

This construction is especially expedient when the contaminated air is added to the filter device at a high temperature.

A second embodiment suitable for cooling contaminated air with lower temperatures, the secondary air can function as a cooling device. The contaminated air is then brought to circulate abeam of the perforated tubes, while the secondary air is sucked in along the tubes having its holes place on the lee side. The two air currents are mixed, when the secondary air streams out of the holes in the perforated tube. During this process the secondary air cools off the perforated tubes, which again cool off the contaminated air.

By cooling off the contaminated air, is obtained, as mentioned before, that the temperature of the air is adjusted to the most suitable level for the the ultra-violet lamps to function at its optimum. Another advantage is obtained by a reduction of the humidity of the air, as a part of the aqueous vapour in the air condense on the tubes and leaves the house via drain pipes herein.

BRIEF DESCRIPTION OF THE DRAWINGS

The invention will be explained more fully in the following description of embodiment which just serves as example, with reference to the drawing, where FIG. 1 schematically shows, seen from the side, partly sectional, a filter device according to the invention adapted for de-sucktion and purification of contaminated air from an industrial deep-fat fryer for preparation of a foodstuff product.

DETAILED DESCRIPTION OF THE PREFERRED EMBODIMENTS

Figure 1:
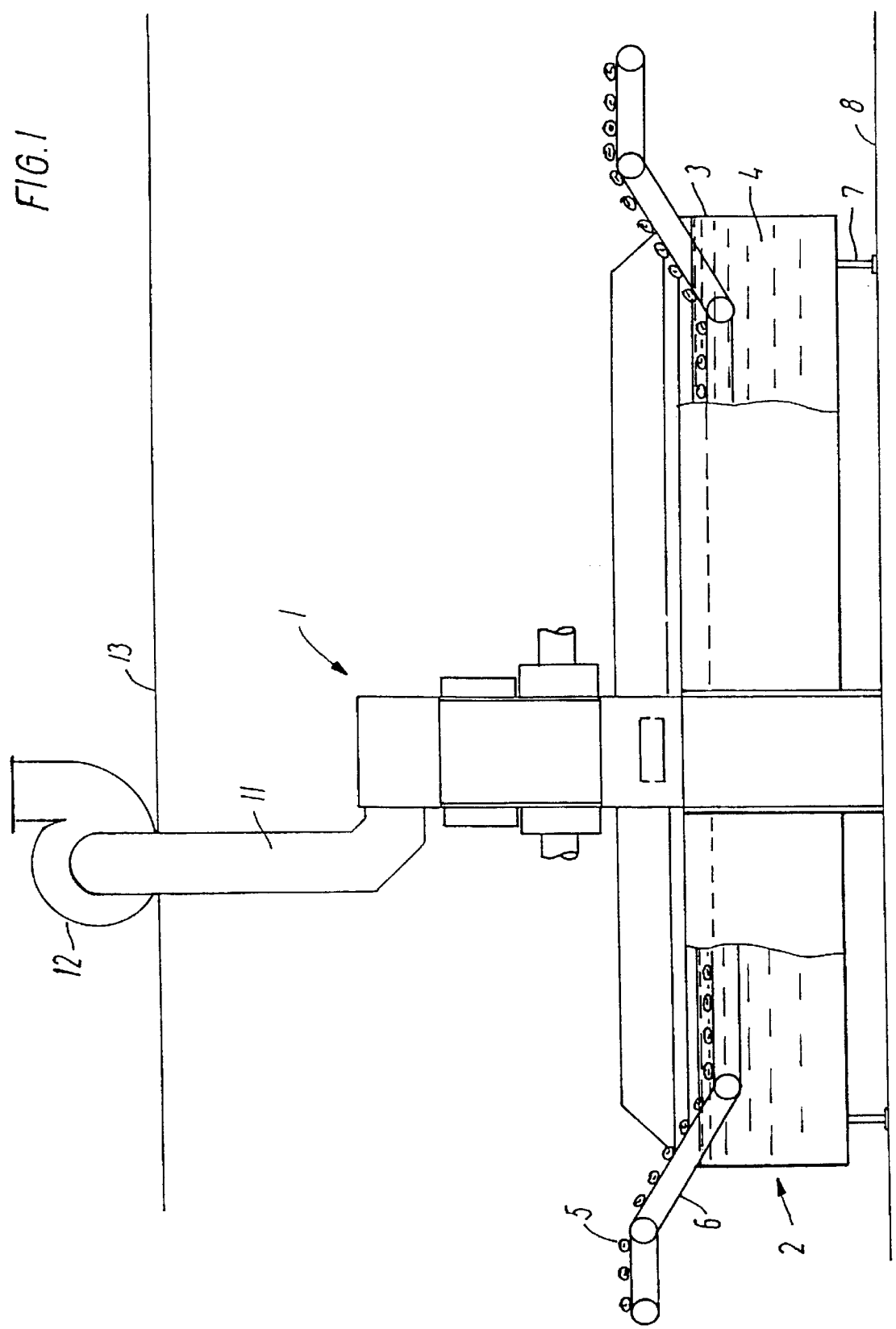
Figure 2:
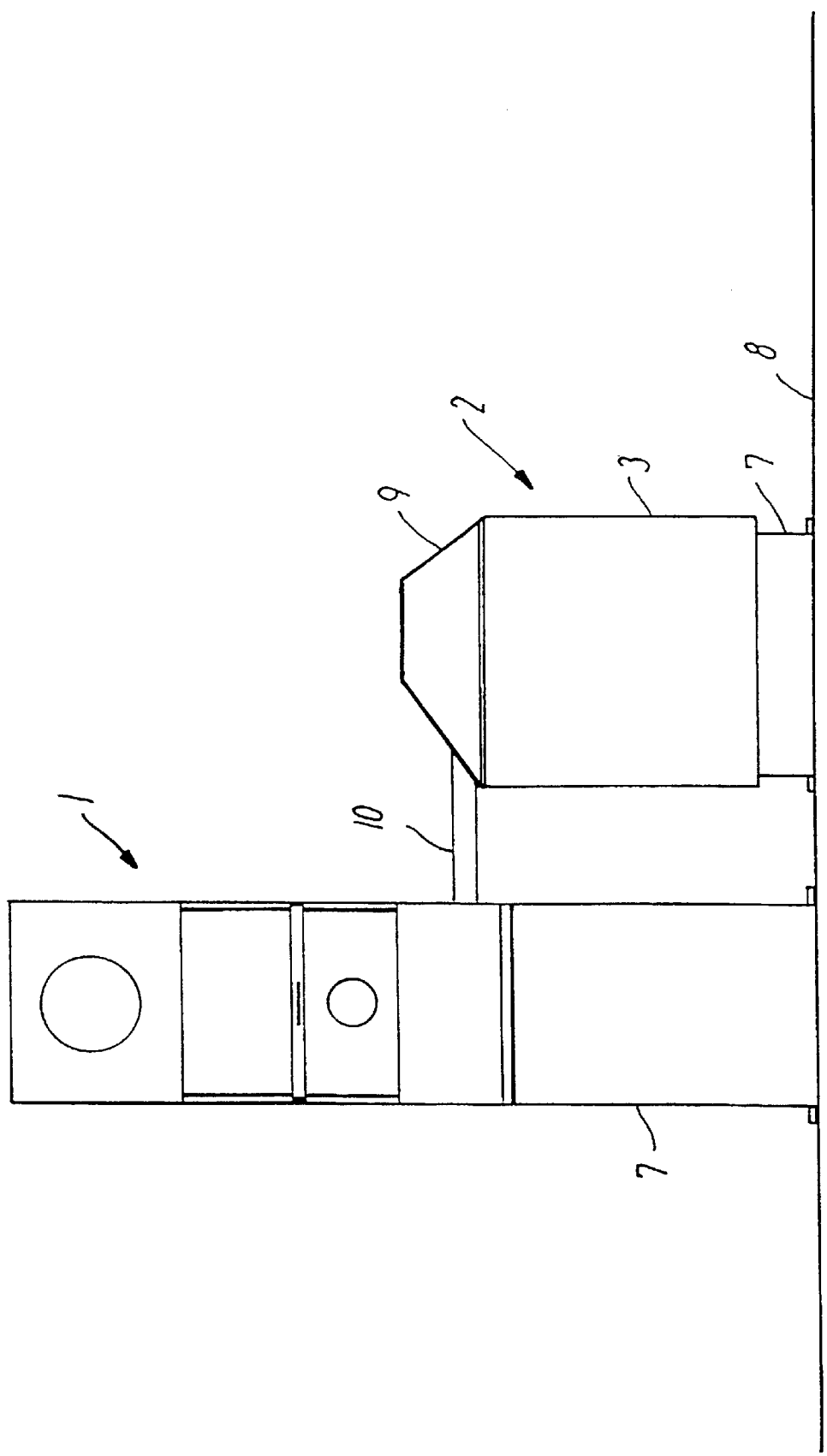
FIG. 2 shows the same, seen from the end.

FIGS. 1 and 2 show a filter device according to the invention, which in general is indicated by the reference number 1. In this case of example, the filter device serves the purpose of removing air contaminated with especially dripping by industrial preparation of a foodstuff in a deep-fat fryer, which in general is indicated by the reference number 2.

The deep-fat fryer is shaped as a big oblong basin 3, which is filled with hot dripping 4, serving the purpose of frying a foodstuff product 5, which is divided into pieces. The single pieces 5 are in the process placed on an endless wandering grill 6 transporting the product through the deep-fat fryer in submerged condition.

The deep-fat fryer stands with legs 7 on a underlayer 8, e.g. a plant floor. Above the deep-fat fryer is placed a range hood 9, which is connected to the filter device 1 via an air duct 10, (FIG. 2). The range hood collects vapours and particles from the deep-fat frying, especially fat and water vapours.

These vapours and particles are successively sucked from the range hood via the air duct 10, the filter device 1, and a second air duct 11, which is connected to the suction side of a ventilator 12, which is placed on the roof 13 of the production premises and serves the purpose of releasing the purified air into the open.

Figure 3:
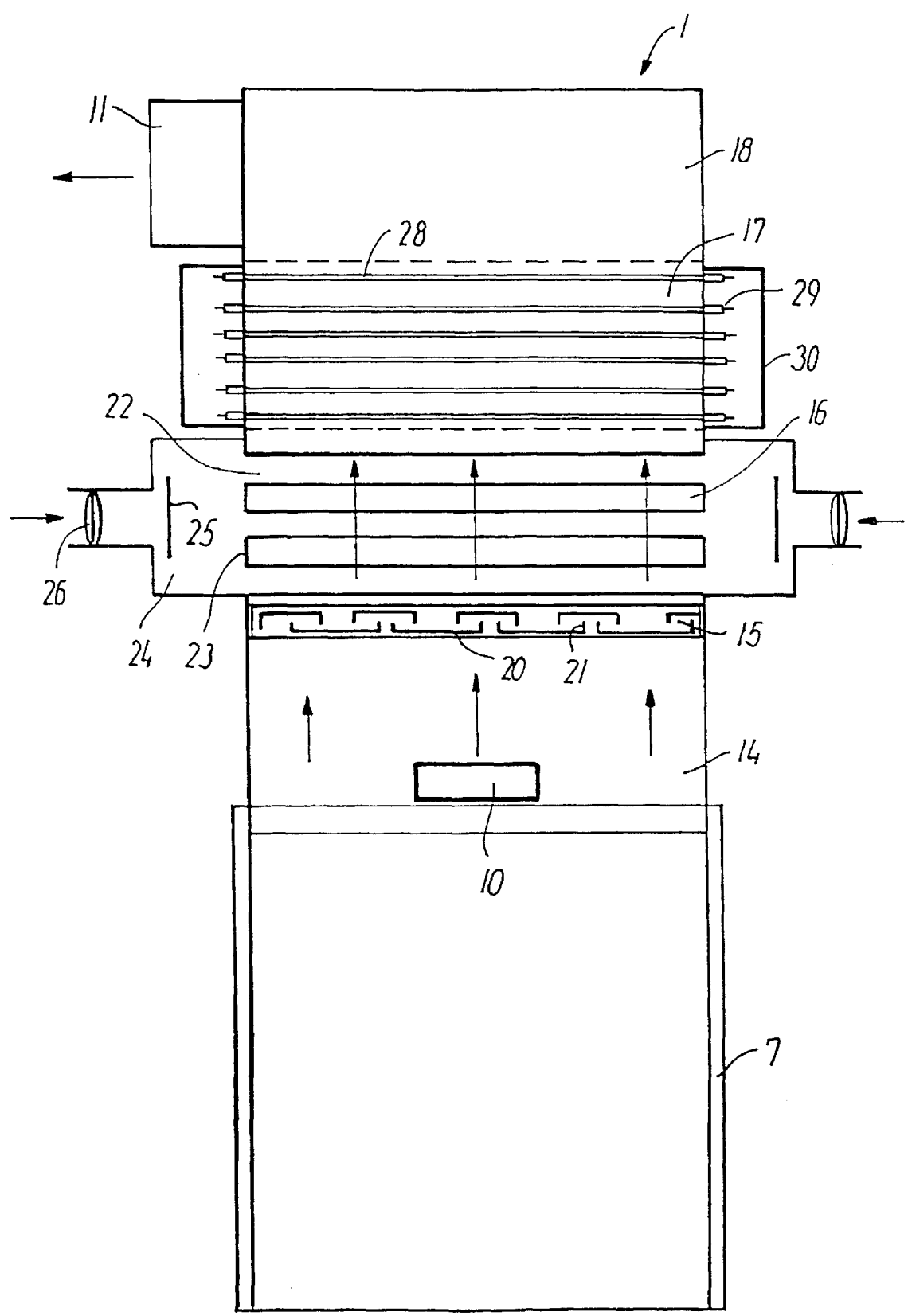
FIG. 3 shows in a large scale, seen from the side, a section through the filter device shown in FIGS. 1 and 2.
Figure 4:
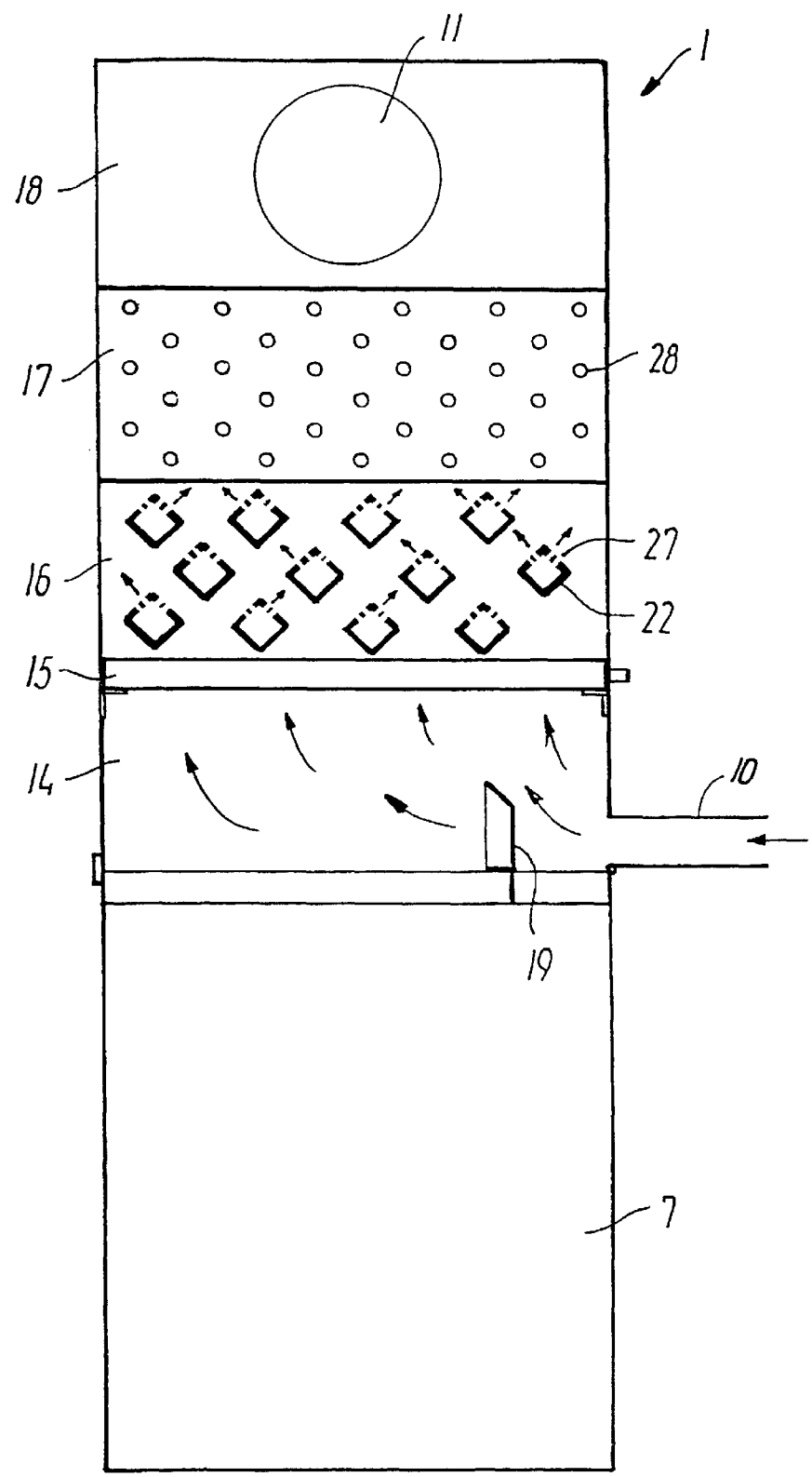
FIG. 4 shows the same, seen from the end.

In FIGS. 3 and 4 are shown the filter device 1 side view and from the end in a cross section, respectively. The filter device comprises five chambers placed vertically on top of each other, namely a first chamber 14, a second chamber 15, a third chamber 16, a fourth chamber 17 and a fifth chamber 18. The chambers are in open connection with each other, and the first chamber 14 is furthermore connected to the range hood 9 via the first air duct 10, while the fifth chamber 18 is connected to the ventilator 12 via the second air duct 11.

When the ventilator is on, it drives a stream of contaminated air from the process in the deep-fat fryer 2 through the five chambers 14–18 in the direction indicated by the arrows, whereby the air successively is purified as described in details in the following.

The first chamber 14 is a distribution chamber, in which the air is evenly distributed before it is released into the succeeding chamber 15. In order to obtain an even distribution a distribution sheet 19 is placed somewhere before the outlet of the air duct 10 in the first chamber.

In the second chamber 15 there are placed two rows of sheets 20, which are displaced in relation to each other. Each sheet has along the two opposite sides a folded flap 21, and the flaps in the one row are furthermore turning towards the sheets in the other. When the air is streaming through the sheet rows, it will consequently be forced to several sudden changes of direction, whereby particulate matter and water are separated from the air and removed via drain ducts (not shown).

In the third chamber 16 there is transverse to the air stream placed a number of quadrangular tubes 22, extending between two of the opposite walls 23 of the chamber. The tubes 22 are tightly connected to these walls 23 and end in, as shown, an inlet duct 24 on each side of the third chamber 16. In each inlet duct 24 is placed a distribution sheet 25 for distribution of the air let in through the duct 24. Furthermore a gate 26 is placed for optional close of the duct in question or throttle down the through flow. The quadrangular tubes 22 are at the lee side of the contaminated air stream perforated with a number of rather small holes 27.

At the lee side of the quadrangular tubes 22 a partial vacuum emerges when the contaminated air streams by. As a result of this partial vacuum, secondary air is via the inlet ducts 24 in the direction of the arrows from an air source, e.g. the surrounding air, sucked in through the quadrangular tubes 22. The secondary air is even distributed over the mouths of these tubes due to the presence of the distribution sheet 25. The air is let out of the holes 27 in the tubes and is thereby mixed smoothly with the passing contaminated air.

The secondary air cools during the passage the quadrangular tubes 22, which again cool the contaminated air, the temperature of which thereby can be lowered to a temperature suitable for the process in the succeeding fourth chamber 17. A part of the content of aqueous vapours in the air will at the same time condense on the tubes and be removed via drain ducts (not shown). Thereby the humidity of the air is preferably reduced.

In the present case the tubes 22 are quadrangular. This is, however, only to be understood as an example, since the tubes can have any other suitable shape, e.g. round or triangular. They can also be pointed in the longitudinal direction towards the centre to ensure an even outlet of secondary air through the holes 27, and for the same reason the diameter of these holes can decrease towards the centre.

Instead of or as a supplement to the cooling, which thus takes place by means of the secondary air, an evaporator can be inserted, e.g. an electrical evaporator (not shown) before the fourth chamber 17.

Besides, as mentioned, having the effect as a cooling means the secondary flow of air and/or oxygen enriches the contaminated air, when the two air streams blended. As secondary air, e.g. the air which is in the production premises can be used, but in some cases pure oxygen can be advantageous to use, either alone or as a supplement to atmospherical air. The fact, that the contaminated air thus is enriched with oxygen is of great importance to the process in the succeeding fourth chamber 17.

In this chamber is placed a number of lamps 28 for radiating the passing air with short wavelength ultra-violet light. The lamps 28 are high-pressure U.V. lamps and/or low-pressure U.V. lamps or a combination of these types of lamps. The most efficient working temperature of the lamps is approximately 38° C., and that is the reason for cooling the air in the preceding chamber 16 down to or near this temperature in the cases, where the air from the production process had a higher temperature than 38° C., as it often will be the case within the foodstuff industry, e.g. by deep-fat frying.

The lamps 28 are connected to a suitable current source (not shown) by means of electrical connections 29, which are well protected from exterior influence behind screens 30.

When the oxygen of the oxygen-enriched air is radiated with the short wavelength ultra-violet light, the oxygen is transformed, or at least part of it, into ozone at such a low temperature that there to no substantial extent is a risk for creation of NOX.

The large content of oxygen of the oxygen-enriched air results in the fact that substantial amounts of ozone are created, and ozone is, as well-known, capable of oxidizing organic substances in a so-called cold-combustion and convert the substances into carbon dioxide. Many organic molecules will, however, not be oxidized straight away in this way, but the ultra-violet light also serves the purpose of creating a photo light effect to split the difficult oxidizable molecules to molecules, which more easy can be oxidized by the ozone. The effect of the cold combustion is therefore multiplied many times compared to the results that can be obtained by conventional cold combustions using ozone only.

After the radiation in the fourth chamber 17, air stream into the fifth chamber 18, which is dimensioned with such a large volume, that the cold combustion will have time finish before the purified air is released into the open air via the second air duct 11 and the ventilator 12.

The method and the filter device according to the invention is extremely efficient to purify contaminated air from organic substances without use of chemicals and physical filters, such as fat and carbon filters. The filter device is hygienic and fireproof, since its interior surface is not being covered with organic materials. The releasing tubes and the ventilator are furthermore easy to clean. For the purpose of cleaning all that is needed is a broom since the remnants of the de-contamination process consist of dust.

The above-mentioned described and in the drawings shown filter device is only an example of the way a filter device according to the invention can be constructed.

The filter device can, however, be made in many other ways. Thus can the chambers be placed horizontally or diagonally instead of vertically on top of each other, and the chambers do not have to be build directly together, but can be mutually connected via air ducts.

What is claimed is:

1. Method for removal and/or destruction of organic substances in contaminated air, characterized in that it comprises the following successive process steps:
    a. that the air is brought into a streaming condition;
    b. that the air stream created is brought to change direction at least one time in such a way that solid particles which are entrained in the contaminated air stream are removed;
    c. that the air stream is being cooled such that water and organic substances being in the vapour phase in the contaminated air are condensed and subsequently removed from the air stream;
    d. that the air stream is supplied with a secondary flow of air and/or oxygen;
    e. that the air stream is radiated with ultra-violet light, such that the supplied oxygen forms ozone in situ for oxidizing the organic substances into carbon oxides at a sufficiently low temperature to avoid undesirable radiation byproducts;
    f. that the air stream continues for a predetermined interval of time; and
    g. that the air stream is released.

2. Method for removal and/or destruction of organic substances in contaminated air according to claim 1, characterized in that the air stream is cooled by the secondary flow of air and/or oxygen.

3. Method for removal and/or destruction of organic substances in contaminated air according to claim 1, characterized in that the air stream is radiated with short wavelength ultra-violet light.

4. A filter device for removal and/or destruction of organic substances in contaminated air, having a housing and at least one ventilator for sending an air stream through the housing, which filter device comprises:

a. a first chamber with an opening, which is connected to a source for a contaminated air stream;

b. a second chamber with a number of sheets placed transversely to the main direction of the air stream for making the air stream change direction at least one time in such a way that solid particles which are entrained in the contaminated air stream are removed;

c. a third chamber with a number of perforated tubes which, at least at one end, are in open connection with a secondary air source having oxygen which has a lower temperature than the contaminated air stream to thereby cool the air stream, such that water and organic substances in the vapour phase in the contaminated air are condensed and subsequently removed from the air stream;

d. a fourth chamber with a number of UV lamps for radiating the air stream with ultra-violet light such that the supplied oxygen forms ozone in situ for oxidizing the organic substances into carbon oxides at a sufficiently low temperature to avoid undesirable reaction byproducts;

e. a fifth chamber of a volume, which allows the air stream to stay for a predetermined interval of time in the chamber, and which has an opening, through which purified air is released;

wherein each chamber is connected to the next in succession.

5. A filter device for removal and/or destruction of organic substances in contaminated air according to claim 4, characterized in that there in the first chamber is placed at least one sheet for distribution of the stream of contaminated air.

6. A filter device for removal and/or destruction of organic substances in contaminated air according to claim 4, characterized in that there, in the second chamber transversely to the main direction of the air stream, are placed at least two rows of sheets, that the sheets in each row are placed at a mutual distance, and that each sheet is placed opposite a sheet in the adjoining row.

7. A filter device for removal and/or destruction of organic substances in contaminated air according to claim 4, characterized in that each perforated tube of the third chamber extends transversely to the main direction of the air stream, that each tube is open at least in one end, that this end extends through one of the walls of the chamber, and that the holes in the tubes are placed on the lee side.

8. A filter device for removal and/or destruction of organic substances in contaminated air according to claim 4, comprising an electric evaporator before the fourth chamber.

9. A filter device for removal and/or destruction of organic substances in contaminated air according to claim 4, characterized in that lamps in the fourth chamber are high-pressure UV lamps and/or low-pressure UV lamps for emission of short-wavelength ultra-violet light within a predetermined spectrum.

10. A filter device for removal and/or destruction of organic substances in contaminated air according to claim 4, characterized in that the ventilator is connected to the opening of the fifth chamber.

11. A method for removing and/or destroying organic substances in contaminated air, successively comprising:

bringing the contaminated air having a plurality of solid particles into a streaming condition for a predetermined interval of time to create a contaminated air stream in a device;

changing the direction of the contaminated air stream at least one time in a way sufficient to remove solid particles entrained in the contaminated air stream;

supplying the contaminated air stream with a secondary flow of air and/or oxygen sufficient to impart cooling of the contaminated air stream to condense water and organic substances in the vapor phase to remove them from the air stream;

irradiating the contaminated air stream within a treatment zone with ultra-violet light such that ozone is created in situ from the supplied secondary flow to oxidize the organic substances into carbon oxides at a sufficiently low temperature to avoid undesirable radiation byproducts, thereby decontaminating the air stream; and releasing the decontaminated air stream from the device.

12. The method of claim 11, wherein the irradiating comprises applying short-wavelength ultra-violet light.

\* \* \* \* \*